US009383607B2

(12) United States Patent
Du et al.

(10) Patent No.: US 9,383,607 B2
(45) Date of Patent: Jul. 5, 2016

(54) PATTERNED POLARIZATION CONVERTER (71) Applicant: The Hong Kong University of Science and Technology, Hong Kong (CN)

(72) Inventors: Tao Du, Hong Kong (CN); Vladimir Grigorievich Chigrinov, Hong Kong (CN); Hoi Sing Kwok, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 14/553,539

(22) Filed: Nov. 25, 2014

(65) Prior Publication Data

US 2015/0079302 A1    Mar. 19, 2015

Related U.S. Application Data

(63) Continuation of application No. 13/274,127, filed on Oct. 14, 2011, now abandoned.

(60) Provisional application No. 61/344,807, filed on Oct. 15, 2010.

(51) Int. Cl.
   *G01J 4/00*      (2006.01)
   *G02F 1/1337*    (2006.01)
   (Continued)

(52) U.S. Cl.
   CPC ........ *G02F 1/133788* (2013.01); *G02B 5/3016* (2013.01); *G02B 5/3083* (2013.01); *G02B 5/3091* (2013.01); *G02B 27/286* (2013.01); *G02F 1/0136* (2013.01); *G02F 1/1313* (2013.01); *G02F 2001/133638* (2013.01)

(58) Field of Classification Search
   CPC .......... G02F 1/01; G02F 1/1347; G02F 1/13; C09K 19/04; G02B 27/00
   See application file for complete search history.

(56) References Cited

U.S. PATENT DOCUMENTS 5,548,422 A * 8/1996 Conner ................ G02B 5/3016
                                              349/117
5,828,471 A   10/1998 Davis et al.
(Continued)

OTHER PUBLICATIONS

Du, Tao, et al., "Photo patterned micro polarizer", 17th *International Display Workshop* (*IDW '10*), 565-566 (Fukuoka, Japan) Dec. 1-3, 2010.

(Continued)

*Primary Examiner* — Tarifur Chowdhury
*Assistant Examiner* — Jamil Ahmed
(74) *Attorney, Agent, or Firm* — Leydig, Voit & Mayer, Ltd.

(57) ABSTRACT

The present invention provides a patterned polarization converter having multiple domains that can be used to convert input linear polarized light to output light with spatially varying polarization states, including domains that produce linearly polarized light and domains that produce circular polarized light based on the patterning of the domains. A patterned polarization converter having multiple domains may be used in a polarization sensor application capable of detecting the polarization state of input light. The present invention further provides patterned radial and azimuthal polarization converters, which have utility in applications such as optical tweezers. Additionally, patterned polarization converters may be used to fabricate more patterned polarization converters having the same pattern using one-step photoalignment to copy the pattern of an existing patterned polarization converter to an unpatterned photoalignment layer.

14 Claims, 6 Drawing Sheets

(51) Int. Cl.
*G02B 5/30* (2006.01)
*G02B 27/28* (2006.01)
*G02F 1/01* (2006.01)
*G02F 1/13* (2006.01)
*G02F 1/13363* (2006.01)

(56) References Cited

U.S. PATENT DOCUMENTS

| | | | |
|---|---|---|---|
| 6,563,582 | B1 | 5/2003 | Chun |
| 6,630,289 | B1 | 10/2003 | Kwok et al. |
| 7,821,583 | B2 | 10/2010 | Yeh et al. |
| 2002/0167727 | A1 | 11/2002 | Hansen et al. |
| 2004/0263974 | A1 | 12/2004 | McDonough et al. |
| 2008/0226844 | A1* | 9/2008 | Shemo .............. G02B 5/3016 428/1.1 |
| 2009/0122402 | A1 | 5/2009 | Shemo et al. |
| 2009/0141201 | A1* | 6/2009 | Yeh .............. H04N 13/0434 349/15 |
| 2010/0068419 | A1* | 3/2010 | Kim .............. G02B 5/3016 428/1.23 |
| 2011/0267483 | A1 | 11/2011 | Kanamori |
| 2013/0176566 | A1 | 7/2013 | Mitchell et al. |

OTHER PUBLICATIONS

Duo, Tao et al., "Dual-domain Transflective Liquid Crystal Display using TN and LTN Modes by Photoaliqnment Technology", *Society for Information Display 2009 Symposium (SID '09) Digest*, 406-409 (San Antonio, Texas), May 31-Jun. 5, 2009.

Guo, Junpeng, et al., "Fabrication of thin-film micropolarizer arrays fro visible imaging polarimetry", *Applied Optics*, vol. 39, No. 10, 1486-1492 (Apr. 1, 2000).

Harnett, Cindy, K., et al. "Liquid-crystal micropolarizer array fro polarization-difference imaging", *Applied Optics*, vol. 41., No. 7, 1291-1296 (Mar. 1, 2002).

Mak, Hin Yu, et al., "Photoaligned Transflective Liquid Crystal Display using Low Twist Nematic and Electricity Controlled Birefringence Modes", *Society for Information Display 2008 Symposium (SID '08) Digest*, 1908-1911, Los Angeles, CA, (May 18-23, 2002).

Nersisyan, Sark, et al., "Axial polarizers based on dichroic liquid crystals", *Journal of Applied Physics*, 108 (3):033101-033101-5, (Published online Aug. 4, 2010).

Peeters, Emiel, et al., "High-Contrast Thin-Film Polarizers by Photo-Crosslinking of Smectic Guest-Host Systems", *Advanced Materials*, 18:2412-2417 (2006).

Stalder, M., et al., "Linearly polarized light with axial symmetry generated by liquid-crystal polarization converters", *Optic Letters* vol. 21., No. 23, 1948-1950 (Dec. 1, 1996).

Yao, Lishuang, et al., "Tunable Photosensitivity of Alignment Film for Flexible Liquid Crystal Displays", *Society for Information Display 2009 Symposium (SID '09) Digest*, 1630-1633, San Antonio Texas, (May 31-Jun. 5, 2009).

Yaroshchuk, O., et al., "Stabilization of liquid-crystal photoaligning layers by reactive mesogens", *Applied Physics Letters* 95;021902 (2009).

Yip, W.C., et al., "Photo-patterned e-wave polarizer", *Displays* 22, 27-32 (2001).

Zhao, Xiaojin, et al., "Liquid-crystal micropolarimeter array for full Stokes polarization imaging in visible spectrum", *Optics Express*, vol. 18., No. 17, 17776-17787 (Aug. 3, 2010).

Zaho, Xiaojin, et al., "High-resolution photoaligned liquid-crystal micropolarizer array for polarization imaging in visible spectrum", *Optics Letters*, vol. 34, No. 23, 3619-3621 (Dec. 1, 2009).

Du, et al., "*Photo patterned micro polarizer and method for making the same*", U.S. Appl. No. 61/344,807, filed Oct. 15, 2010.

U.S. Appl. No. 13/274,127, filed Oct. 14, 2011.
U.S. Appl. No. 13/888,061, filed May 6, 2013.
U.S. Appl. No. 14/689,666, filed Apr. 17, 2015.

* cited by examiner

PATTERNED POLARIZATION CONVERTER

CROSS-REFERENCE TO RELATED APPLICATIONS

This patent application is a continuation of copending U.S. patent application Ser. No. 13/274,127, filed Oct. 14, 2011, and claims the benefit of U.S. Provisional Patent Application No. 61/344,807, filed Oct. 15, 2010, which is incorporated by reference.

FIELD OF THE INVENTION

The present invention relates generally to polarizers and more specifically to patterned polarizer converters and corresponding methods of fabrication.

BACKGROUND OF THE INVENTION

Polarizers are an important optical element widely used in displays, communication systems, and sensors. Conventional polarizers are capable of converting non-polarized light to linear polarized light with one particular polarization direction, with the linear polarization direction being spatially uniform.

However, in certain applications, spatially non-uniform polarizers are desired. For example, some applications involving photoalignment technology require micro-patterned polarizers with spatially varying linear polarization directions. Other applications may require patterned polarizers which can generate both linear polarization with spatially varying directions, as well as circular polarization, for example polarization sensors.

Conventional patterned polarizers include micro-patterned polarizer arrays based on wire grid polarizers, photoaligned azo-dye polarizers, and liquid crystal micro polarizer arrays for image sensing. However, wire grid polarizers require photolithography and are cost-prohibitive with respect to multi-domain patterns, photoaligned azo-dye polarizers have insufficient extinction ratios, and the thickness of liquid crystal micro polarizer arrays causes problems in image sensing applications. Other conventional patterned polarizers are similarly overly complex for practical manufacturing purposes or suffer from other drawbacks rendering them unsuitable for practical applications.

BRIEF SUMMARY OF THE INVENTION

The present invention provides a patterned polarization converter and a cost-efficient method for fabrication. In an embodiment, the invention includes a patterned polarization converter comprising a quarter wave plate and a patterned quarter wave plate positioned substantially parallel to the quarter wave plate, where the patterned quarter wave plate comprises at least one retardation domain corresponding to an optical axis and at least one other retardation domain corresponding to a different optical axis or at least one non-retardation domain. The patterned polarization converter may be configured to convert linearly polarized light input through the quarter wave plate to light having spatially varying polarization states output through the patterned quarter wave plate. The patterned polarization converter may also be used in a polarization sensor and convert polarized light input through the patterned quarter wave plate to linearly polarized light output through the quarter wave plate.

The quarter wave plate and the patterned quarter wave plate may be broad-band quarter wave plates, and may be liquid crystal cells or solid retardation plates (or a combination thereof). Solid retardation plate configurations include retardation film (e.g., liquid crystal polymer film) and solid crystal configurations. If a quarter wave plate or patterned quarter wave plate is a liquid crystal cell, the liquid crystal cell may comprise two electrodes to which a voltage source may be connected for switching retardation domains on and off and for tuning the retardation domains.

In further embodiments, the patterned polarization converter may be configured such that it converts linearly polarized light input through the quarter wave plate into radially or azimuthally polarized light output through the patterned quarter wave plate.

In another embodiment, the invention includes a method for fabricating a patterned polarization converter comprising producing a patterned quarter wave plate, wherein the producing includes application of a photoalignment layer to a substrate and exposure of the photoalignment layer through a template patterned polarization converter; and providing a quarter wave plate positioned substantially parallel to the patterned quarter wave plate. The patterned quarter wave plate may be a solid retardation plate, wherein the producing further includes depositing of a layer of LCP onto the photoalignment layer and polymerizing the layer of LCP. The patterned quarter wave plate may also be a liquid crystal cell, wherein the producing further includes assembly of a cell using the substrate and another substrate, and filling an area between the substrates with liquid crystal.

In a further embodiment, the template patterned polarization converter comprises a first retardation domain corresponding to an optical axis and at least one of another retardation domain corresponding to a different optical axis than the first retardation domain and at least one non-retardation domain.

In yet another further embodiment, the invention includes a polarization sensor comprising a patterned polarization converter, a linear polarizer, and a sensor array. The sensor array may be a CCD (charge-coupled device) or CMOS (complementary metal-oxide-semiconductor) sensor array and may contain pixels that correspond to domains of the patterned polarization converter.

Other objects and advantages of the invention will become apparent upon reading the following detailed description and upon reference to the drawings.

DETAILED DESCRIPTION OF THE INVENTION

An object of the present invention is to provide a patterned polarization converter having multiple domains that can be used to convert input linear polarized light to output light with spatially varying polarization states, including domains that produce linearly polarized light and domains that produce circular polarized light based on the patterning of the domains. In other embodiments, a patterned polarization converter having multiple domains may be used in a polarization sensor application capable of detecting the polarization state of input light. Further embodiments of the present invention include radial and azimuthal polarization converters, which have utility in applications such as optical tweezers. Additionally, patterned polarization converters may be used to fabricate more patterned polarization converters having the same pattern using one-step photoalignment to copy the pattern of an existing patterned polarization converter to an unpatterned photoalignment layer.

Generally speaking, a half wave plate can be used to rotate the polarization direction of input linear polarized light by 90°, while a quarter wave plate can be used to convert input linear polarized light to output circular polarized light. The term quarter wave plate, as used herein, includes λ/4 plates, 3λ/4 plates, 5λ/4 plates, 7λ/4 plates, and so forth, as any of these types of plate convert linearly polarized light to circularly polarized light (differing in whether the circularly polarized light is right circularly polarized or left circularly polarized). It will be appreciated that the performance of half wave and quarter wave plates are typically wavelength specific, but broad-band half wave and quarter wave plates have been developed and are widely used in many applications.

A quarter wave plate can also convert input circular polarized light to output linear polarized light, with the polarization direction depending on the optical axis of the quarter wave plate. Thus, two quarter wave plates, positioned substantially parallel to one another, may be used as a linear polarization converter for converting input linearly polarized light to output linearly polarized light with the linear polarization direction of the output light depending on the optical axis of the second quarter wave plate.

Figure 1:
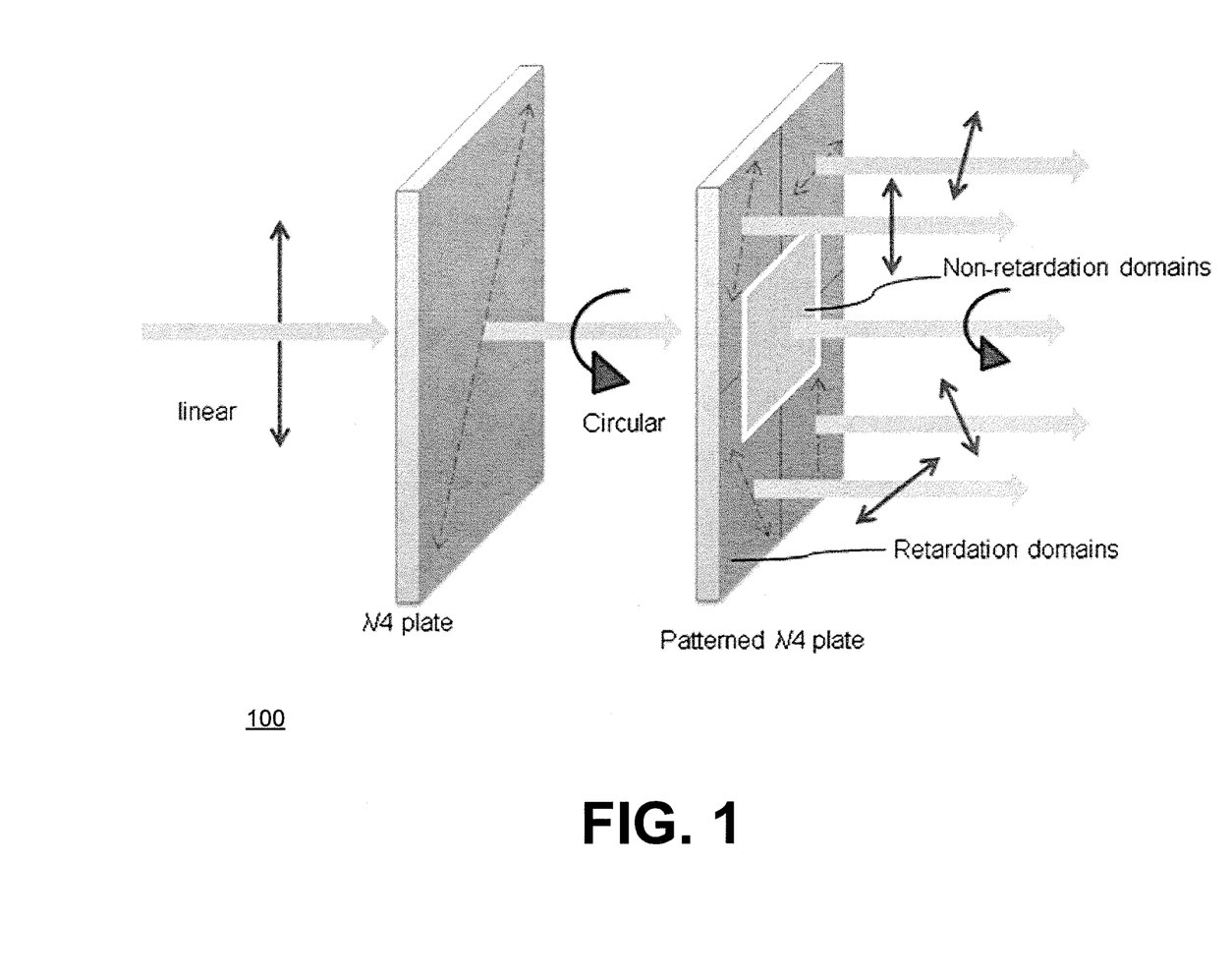
FIG. 1 is a schematic diagram of a patterned polarization converter in an embodiment having a quarter wave plate and a patterned quarter wave plate with both retardation domains and non-retardation domains, wherein linearly polarized light is input through the quarter wave plate.

Turning now to FIG. 1, which depicts a schematic diagram 100 of a patterned polarization converter in an embodiment of the present invention, the second plate is a patterned quarter wave plate that is patterned with different domains with spatially varying alignment of the optical axes, and further patterned with a non-retardation domain in the center (the disclosure herein refers to the first quarter wave plate without multiple domains patterned on it as a "quarter wave plate" whereas the second quarter wave plate patterned with multiple domains is referred to as a "patterned quarter wave plate"). This patterning, which includes both retardation and non-retardation domains, is achieved through the use of a multi-step photoalignment process. Each domain (corresponding to a region having a certain alignment pattern) may be exposed separately through the use of photoalignment masks. Thus, each domain of a photoalignment layer may be exposed by linearly polarized light (of an appropriate wavelength corresponding to the material used for the photoalignment layer) corresponding to the desired alignment pattern while other domains of the photoalignment layer are protected by using one or more photoalignment masks. This process is repeated for each domain until all domains of the photoalignment layer have been exposed.

Additionally, non-retardation domains may be patterned onto the photoalignment layer. Using photoalignment material that is sensitive to both input light polarization as well as input light exposure dosage, the in-plane alignment of the photoalignment layer may be controlled by the polarization direction of the light and the tilt angle of the photoalignment layer may be controlled by the input light exposure dosage. Given a certain amount of input light exposure dosage, vertical alignment of an exposed domain of the alignment layer may be achieved, such that a non-retardation domain is generated.

The size of the domains can be made as small as 1 μm. In another embodiment, the patterning of the patterned quarter wave plate may be performed using a spatially varying linearly polarized light source (generated by passing light through a patterned polarization converter) as described below in relation to FIGS. 5 and 6.

In one embodiment, the patterned quarter wave plate may be a retardation film (one type of "solid retardation plate") made of Liquid Crystal Polymer (LCP) with different alignment directions. To generate this retardation film, a photoalignment layer may be applied to a substrate and exposed through a multi-step process as described above. Then, a layer of LCP may be deposited on the exposed photoalignment layer, and the LCP may be polymerized using light of an appropriate wavelength (e.g., ultraviolet light).

In another embodiment, the patterned quarter wave plate may be a patterned liquid crystal cell having spatially varying alignment directions. To produce this liquid crystal cell, a photoalignment layer may be applied to a substrate and exposed through a multi-step process as described above. Before or after the photoalignment, the substrate may be assembled with another substrate to from a cell, and the cell may be filled with liquid crystal in the area between the two substrates. In a further embodiment, the cell may include electrodes, to which a voltage source for applying an applied voltage to the liquid crystal cell may be connected.

It will be appreciated that the quarter wave plate may also be either a retardation film including an LCP layer or a liquid crystal cell. In other embodiments, the quarter wave plate may also be a solid crystal quarter wave plate (another type of "solid retardation plate"), or the quarter wave plate may be made using other types of birefringent material. The patterned quarter wave plate, however, would preferably be made using photoaligned LCP or a photoaligned liquid crystal cell.

FIGS. 1-4 depict the quarter wave plate and patterned quarter wave plate as being separated for purposes of illustration, but it will be appreciated that in practice, they may be, for example, disposed on opposing sides of a single substrate, may be fabricated together on the same side of a substrate, may be liquid crystal cells, or may actually be held apart from each other. In one exemplary embodiment, if the quarter wave plate is a commercialized film, it may be attached to one side of a glass substrate while the patterned quarter wave plate is fabricated on the other side of the glass substrate. In another exemplary embodiment, the quarter wave plate can be fabricated on one side of a substrate using LCP with the alignment layer of the quarter wave plate being treated by any conventional alignment methods to give it the properties of a quarter wave plate, and then a photoalignment layer may be deposited on top of the quarter wave plate, patterned through the multi-step photoalignment process described above, and deposited with another LCP layer, which is exposed to complete the fabrication of the patterned polarization converter having a quarter wave plate and a patterned quarter wave plate. In other exemplary embodiments where one of the plates is a liquid crystal cell, the other plate can be a solid plate or a film attached to the liquid crystal cell, or, if both plates are liquid crystal cells, the two liquid crystal cells can be attached to each other. In further exemplary embodiments where the quarter wave plate is a solid crystal quarter wave plate, it may be attached to or held at a fixed position relative to the patterned quarter wave plate.

The device shown in FIG. 1 may thus be used as a patterned linear polarization converter that converts input linearly polarized light to output light having linear polarization domains with spatially varying polarization directions as well as circular polarization domains, as depicted by FIG. 1. As discussed above, when linearly polarized light passes through a quarter wave plate with optical axis oriented at 45° or −45° relative to the polarization direction of the linearly polarized light, it will be converted to circularly polarized light. Circularly polarized light passing through the non-retardation domains of the patterned quarter wave plate depicted in FIG. 1 will be unaffected by the patterned quarter wave plate and maintain its circularly polarized state. Circularly polarized light passing through the spatially varying retardation domains of the patterned quarter wave plate depicted in FIG. 1 will be converted to linearly polarized light with spatially varying polarization directions corresponding to the optical axes of the retardation domains of the patterned quarter wave plate. It will be appreciated that FIG. 1 is merely an exemplary patterned linear polarization converter, and that one skilled in the art would understand that the configuration of the various domains in the patterned quarter wave plate may be arbitrarily varied according to one's choosing.

Figure 2:
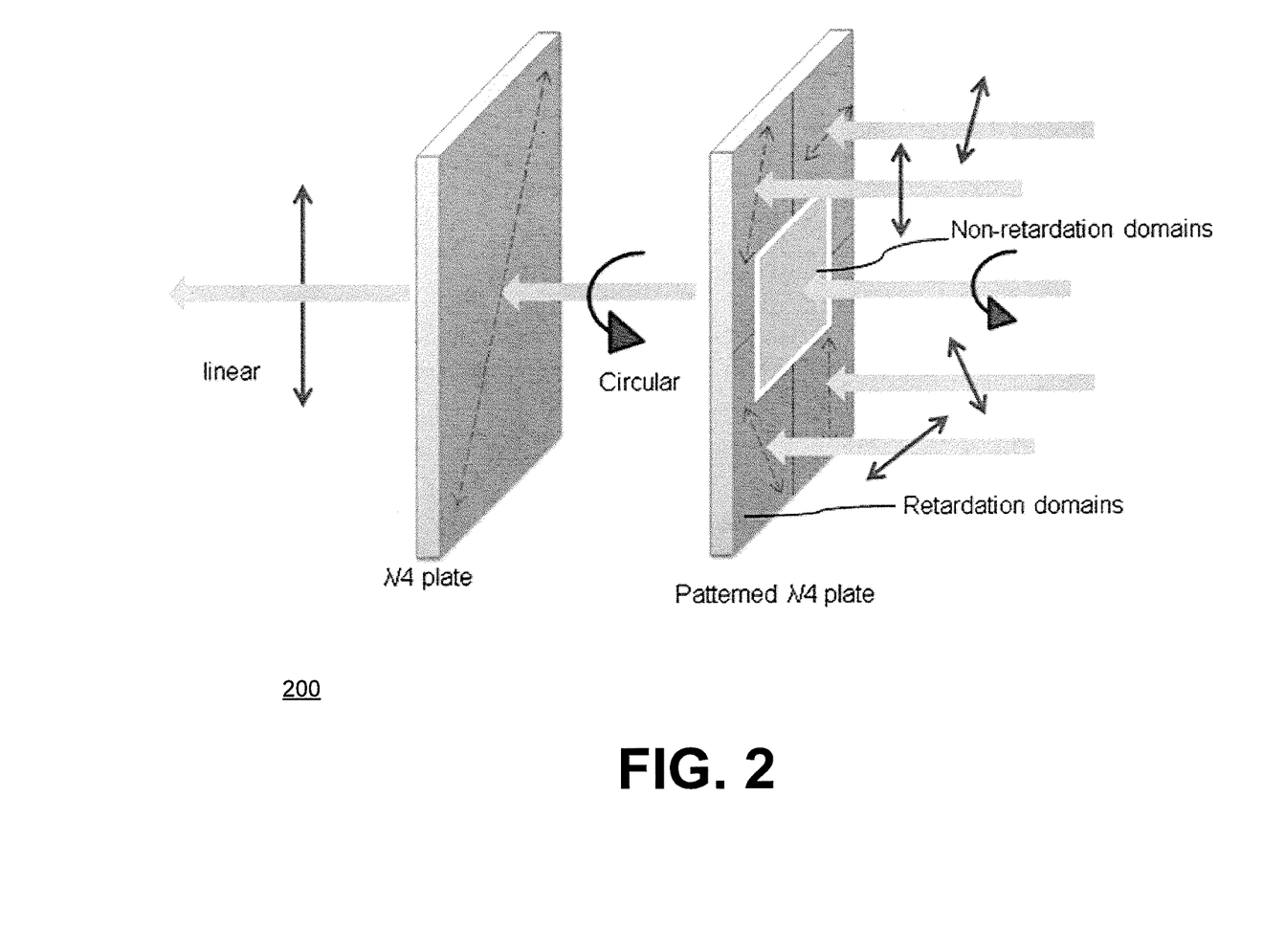
FIG. 2 is a schematic diagram showing a patterned polarization converter in another embodiment having a quarter wave plate and a patterned quarter wave plate with both retardation domains and non-retardation domains, wherein linearly polarized light is output through the quarter wave plate.

FIG. 2 depicts a schematic diagram 200 of a patterned polarization converter being used in a polarization sensor application. As can be seen from FIG. 2, if light of varying polarization states is input through the patterned quarter wave plate at retardation and non-retardation domains corresponding to the polarization states of the input light, it will be converted to linearly polarized light output through the quarter wave plate. The example of input light and output light depicted by FIG. 2 shows input light having spatially variable polarization states corresponding to the retardation and non-retardations domains of the patterned quarter wave plate.

The exemplary input light shown in FIG. 2 includes light having several different polarization states, including 45° linear, −45° linear, 0° linear, 90° linear, left circular (as viewed from the source), and the patterned polarization converter has five domains in the patterned quarter wave plate corresponding to each of those polarization states. Thus, the spatially varying input light is converted to a single linear polarization state (i.e., 0° linear in this example), and the intensity corresponding to each domain may be detected. In another example (not depicted) using the same patterned polarization converter, if only left circularly polarized light is input into the patterned polarization converter through the patterned quarter wave plate, the output light corresponding to the region of the non-retardation would have an intensity of 100% (or 0%, depending on the alignment of the quarter wave plate) relative to the output from the other domains, which would have an intensity of 50%. Thus, it can be seen that this intensity information may be used to determine the polarization states of various input light.

It will be appreciated that a CCD (charge-coupled device) or CMOS (complementary metal-oxide semiconductor) sensor array, in addition to a linear polarizer for filtering out only the linearly polarized light having a polarization direction corresponding to the polarization direction of the light output from the patterned polarization converter, may be used in combination with the patterned polarization converter in polarization sensor applications. Using a CCD or CMOS sensor array having one or more pixels aligned to at least one domain of the polarization converter, the intensity or intensities of the light output through the patterned polarization converter and passed through the linear polarizer (which corresponds to the domains of the patterned polarization converter and the polarization state or states of the input light) can be separately detected and calculated based on Johns or Stokes matrix calculations. An example of the use of CMOS sensor arrays and Stokes matrix calculations in a polarization sensing application is provided by Zhao et al., "Liquid-crystal micropolarimeter array for full Stokes polarization imaging in visible spectrum," Optics Express Vol. 18, No. 17, pp. 1-12 (August 2010), which is incorporated herein by reference in its entirety. It will be appreciated that if only non-polarized light is input through the patterned polarization converter in a polarization sensing application, the intensity of the light received at the sensor array will be uniform regardless of which domain of the patterned quarter wave plate that it passes through.

Figure 3:
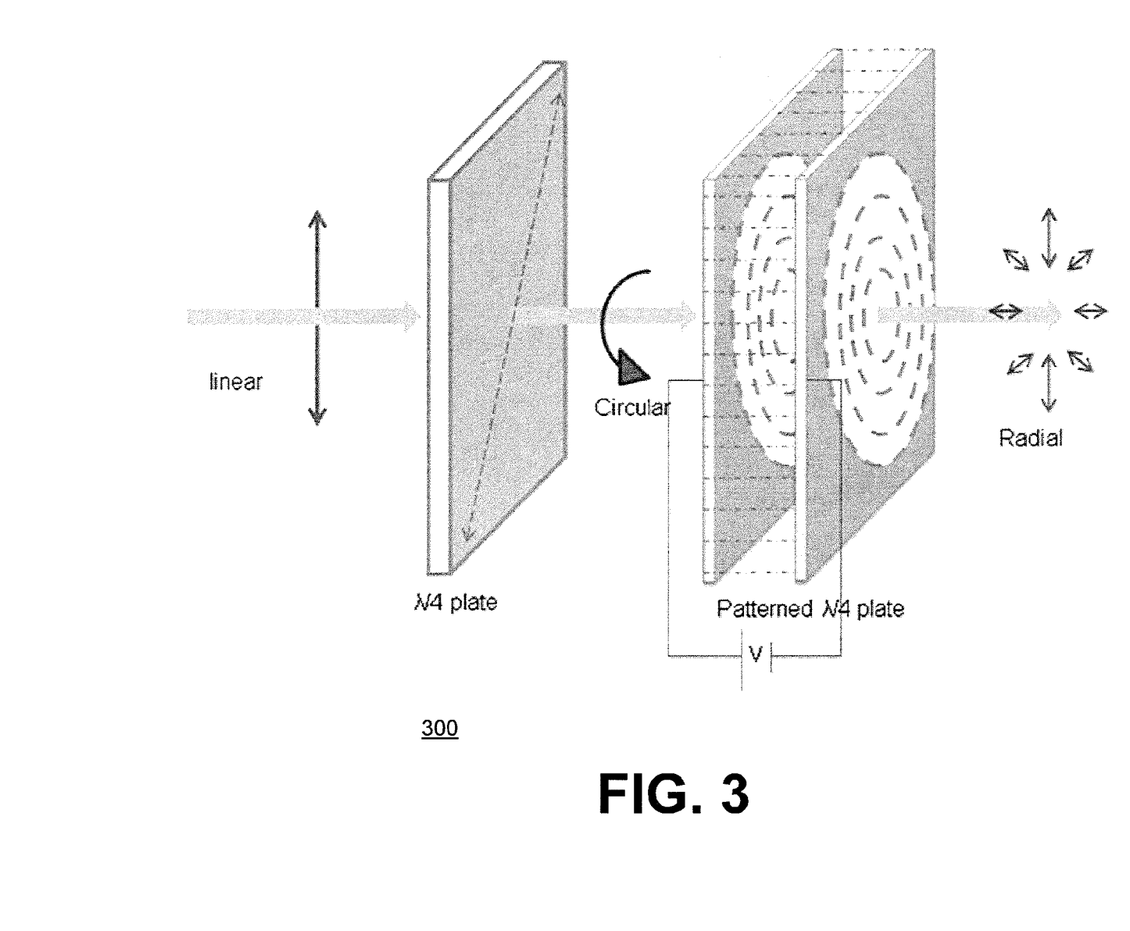
FIG. 3 is a schematic diagram of a patterned radial polarization converter in an embodiment having a quarter wave plate and a patterned quarter wave plate, having two electrodes, patterned with a circular symmetric alignment and biased by an applied voltage, configured to convert input linear polarized light to output radially polarized light.

FIG. 3 depicts a schematic diagram 300 of a patterned radial polarization converter in an embodiment wherein the patterned quarter wave plate includes a liquid crystal layer patterned with a circular symmetric alignment and two electrodes biased by a voltage source capable of applying different amounts of voltage to the electrodes of the patterned quarter wave plate. It will be appreciated that the patterned quarter wave plate may be fabricated as described above using a multi-step photoalignment process or as described below in conjunction with FIG. 5 using a single-step photoalignment process. An example of a multi-step photoalignment process would be to use a mask with a thin strip aperture and only photoalign a thin section of the photoalignment layer at a time. By rotating the photoalignment layer and substrate, a circular symmetric alignment may be achieved on the photoalignment layer.

The patterned radial polarization converter depicted in FIG. 3 converts linearly polarized light input through the quarter wave plate to radially polarized light output through the patterned quarter wave plate. Additionally, the applied voltage may be used to switch the retardation domains of the patterned quarter wave plate on and off (i.e., applying at least a certain amount of voltage causes the liquid crystal molecules to align vertically and will switch off the retardation domains such that the retardation domains act as non-retardation domains). Furthermore, adjusting the applied voltage allows for tuning of the patterned quarter wave plate to optimize it for certain wavelengths based on the applied voltage. Because the applied voltage affects the tilt of the liquid crystal molecules and the birefringence magnitude corresponding to the liquid crystal layer, different voltages will cause the liquid crystal layer to provide different retardation values for a wavelength of light. Thus, adjusting the applied voltage allows the patterned quarter wave plate to achieve particular results with different wavelengths.

In another embodiment, if a solid LCP patterned quarter wave plate is used in the patterned radial polarization converter, the retardation values are fixed and an applied voltage would not be applicable. It will be appreciated that, because the patterned polarization converters depicted in FIGS. 1 and 2 can have an LCP patterned quarter wave plate or a liquid crystal patterned quarter wave plate, an applied voltage can be added to embodiments of the patterned polarization converters depicted in FIGS. 1 and 2 having liquid crystal patterned quarter wave plates as well. It will further be appreciated that if the quarter wave plates in any of the above-described embodiments are liquid crystal cells, a voltage source may be added to electrodes of the quarter wave plate such that the quarter wave plate is also tunable.

Figure 4:
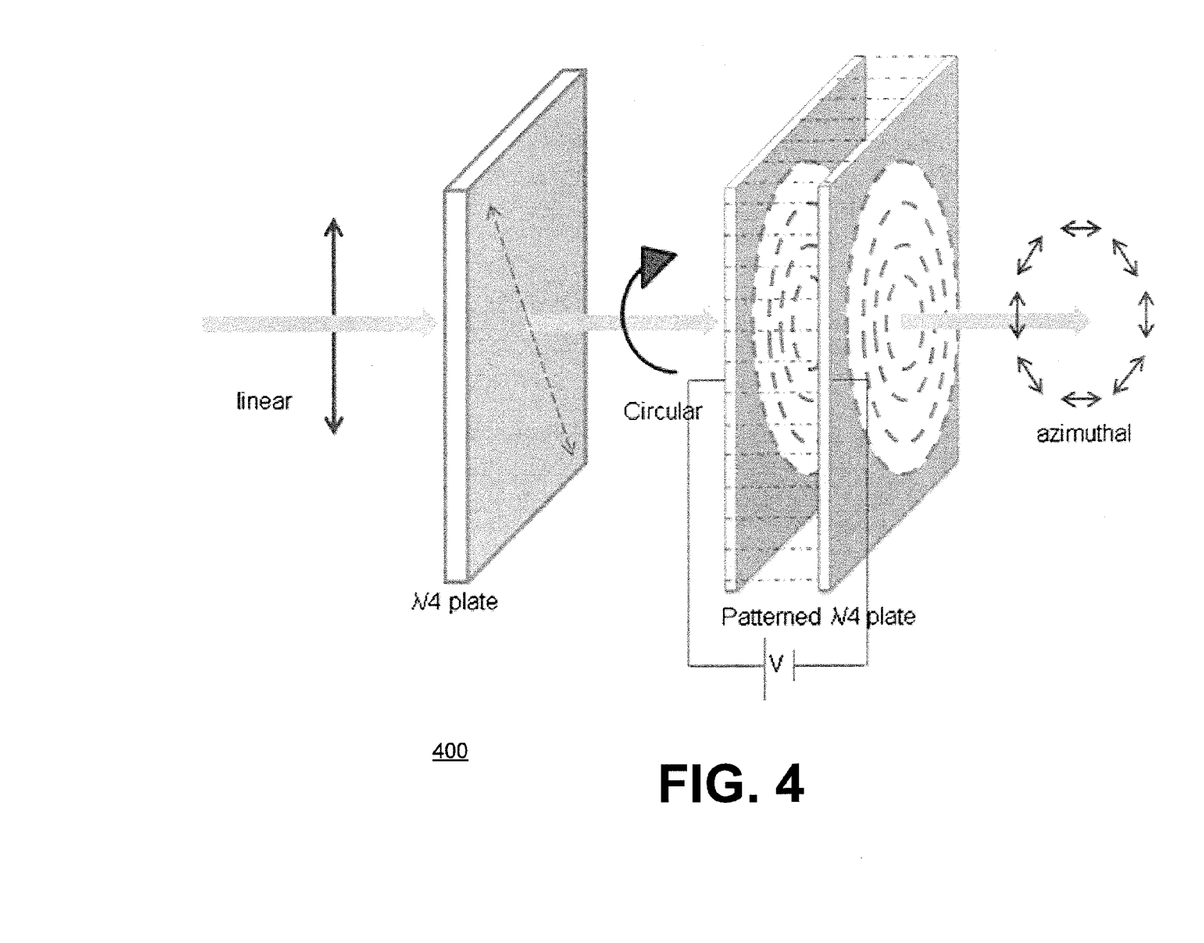
FIG. 4 is a schematic diagram of a patterned azimuthal polarization converter in an embodiment having a quarter wave plate and a patterned quarter wave plate, having two electrodes, patterned with a circular symmetric alignment and biased by an applied voltage, configured to convert input linear polarized light to output azimuthally polarized light.

FIG. 4 depicts a schematic diagram 400 of a patterned azimuthal polarization converter in an embodiment wherein the patterned quarter wave plate is patterned with a circular symmetric alignment and biased by a voltage source capable of applying different amounts of voltage to the electrodes of the patterned quarter wave plate. This patterned azimuthal polarization converter converts linearly polarized light input through the quarter wave plate to azimuthally polarized light output through the patterned quarter wave plate.

Similar to the patterned radial polarization converter of FIG. 3, the patterned azimuthal polarization converter of FIG. 4 can utilize the applied voltage to switch the retardation domains of the patterned quarter wave plate on and off, as well as optimize the patterned quarter wave plate for certain wavelengths. It will be appreciated that the same patterned quarter wave plate may be used in the patterned azimuthal polarization converter of FIG. 4 as in the patterned radial polarization converter of FIG. 3, but that the quarter wave plate where linearly polarized light is input is rotated by 90 degrees in the patterned azimuthal polarization converter relative to the patterned radial polarization converter.

Figure 5:
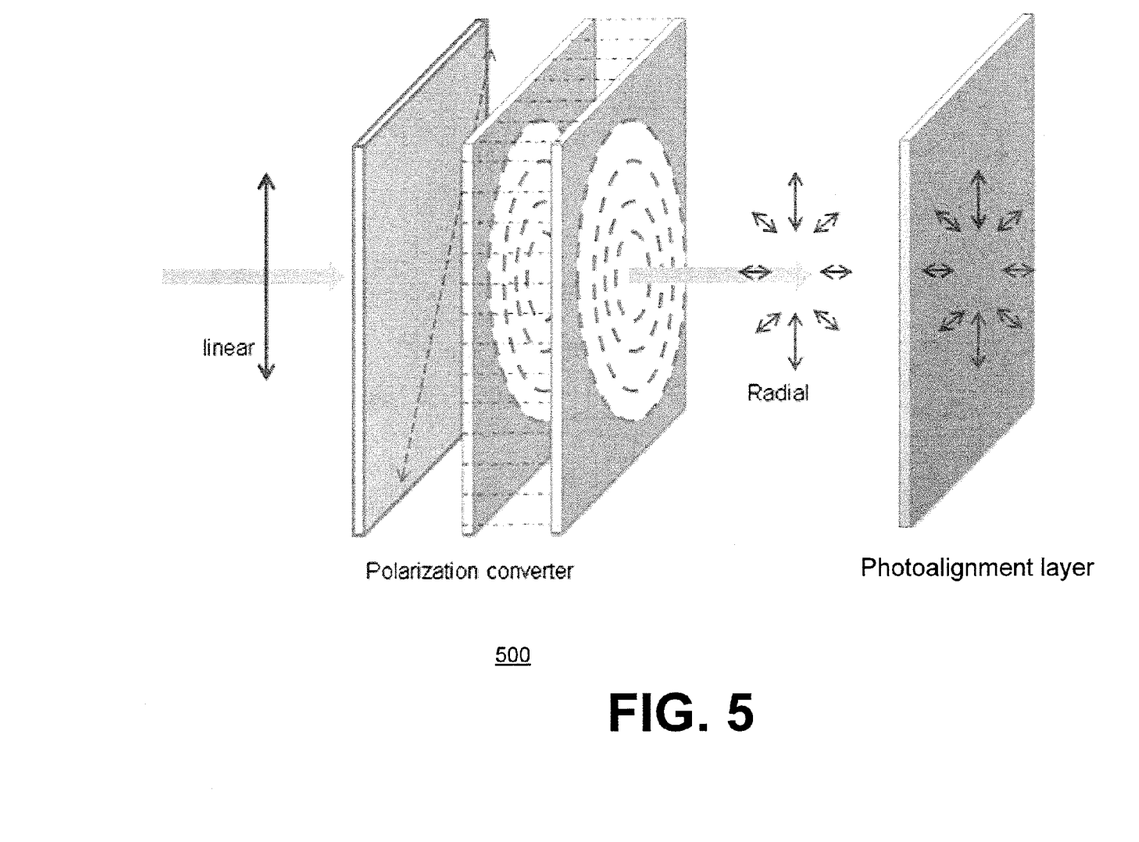
FIG. 5 is a schematic diagram depicting, in an embodiment, a method of copying the design of a patterned quarter wave plate to a photoalignment layer to be used in fabricating additional patterned polarization converters.

FIG. 5 depicts a schematic diagram 500 illustrating, in an embodiment, how a patterned radial polarization converter may be used as a template to fabricate other patterned radial polarization converters having the same a circular symmetric alignment. By using a one-step photoalignment where linearly polarized light from a light source (having appropriate wavelength corresponding to the photoalignment material used) is passed through the template patterned radial polarization converter to a photoalignment layer, the pattern of the patterned quarter wave plate of the patterned radial polarization converter may be copied to the photoalignment layer. This photoalignment layer may be used in fabricating another patterned polarization converter as described in further detail above.

Figure 6:
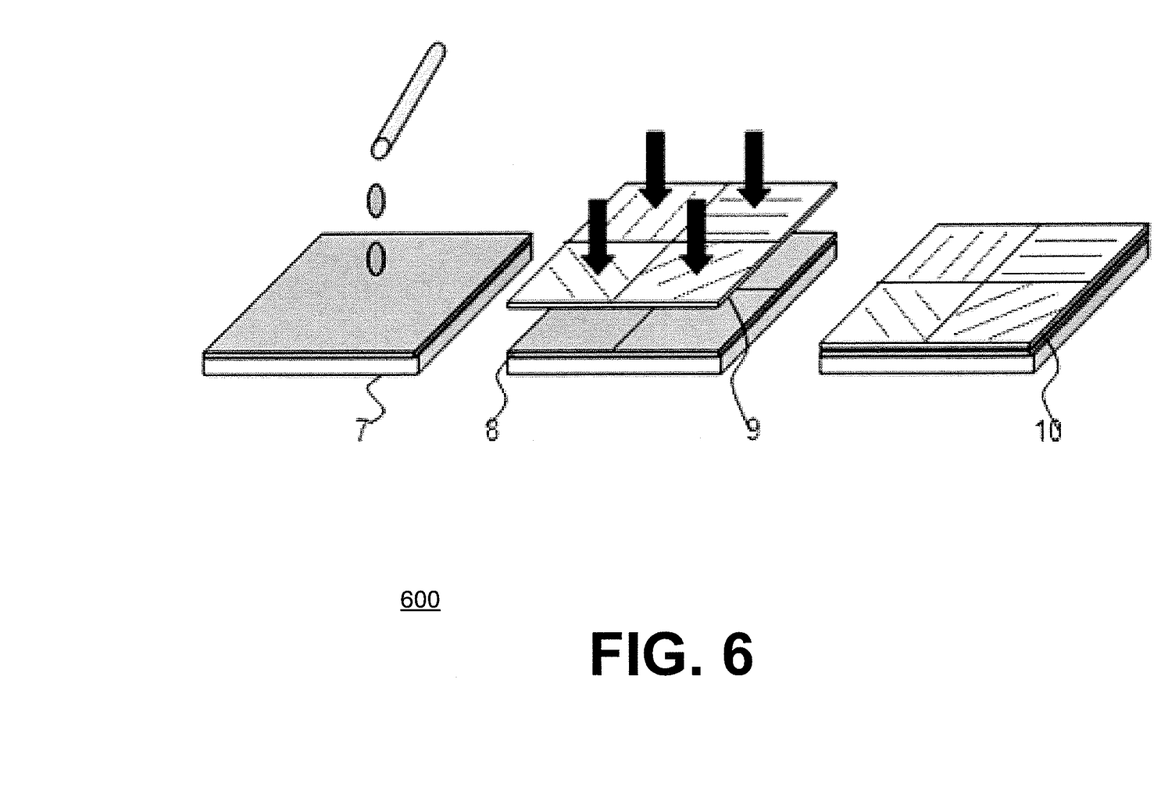
FIG. 6 is a schematic diagram depicting, in another embodiment, a method of copying the design of a patterned quarter wave plate to a photoalignment layer to be used in fabricating additional patterned polarization converters.

FIG. 6 depicts a schematic diagram 600 in another exemplary embodiment illustrating how a patterned polarization converter having four different retardation domains may be used to fabricate another patterned polarization converter having the same four retardation domains. First, a photoalignment layer 8 is deposited on a glass substrate 7. Then, the photoalignment layer is exposed through the existing patterned polarization converter having four different retardation domains 9. Then, a layer of LCP 10 is deposited on top of the photoalignment layer and polymerized using UV exposure, resulting in the molecules of the LCP layer being aligned based on the alignment directions of the photoalignment layer. After the LCP layer has been polymerized, the glass substrate 7 with photoalignment layer 8 and LCP layer 10 may then be used as a patterned quarter wave plate in a patterned polarization converter.

It will thus be appreciated that the process of copying patterned quarter wave plates using one-step photoalignment shown in FIGS. 5 and 6 provides a method of fabricating patterned polarization converters at a greatly reduced cost.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for fabricating spatially-varying liquid crystal alignment structures via one-step photoalignment, the system comprising:
    a light source, configured to generate linearly-polarized light having a wavelength corresponding to a photoalignment material;
    a template patterned polarization converter, having a plurality of retardation domains in a spatially-varying configuration, configured to convert linearly polarized light from the light source to light having a plurality of polarization states corresponding to the plurality of spatially-varying retardation domains, wherein the template patterned polarization converter comprises two wave plates, including:
        a uniform quarter wave plate with optical axis oriented at +45° or −45° relative to the linearly polarized light from the light source, and
        a patterned quarter wave plate having the plurality of spatially-varying retardation domains; and
    a target device, comprising a substrate and a photoalignment layer deposited on the substrate, the photoalignment layer being configured to be exposed to the light having the plurality of polarization states and being made of the photoalignment material;

wherein, after exposure, the target device is configured to provide a further patterned quarter wave plate having the same plurality of spatially-varying retardation domains as the patterned quarter wave plate of the template patterned polarization converter.

2. The system according to claim 1, wherein the target device further comprises a layer of liquid crystal polymer deposited on the photoalignment layer and configured to be polymerized via ultraviolet exposure to align the molecules of the liquid crystal polymer layer based on the exposed photoalignment layer.

3. The system according to claim 1, wherein the patterned quarter wave plate comprises a substrate, a photoalignment layer deposited on the substrate, and a layer of liquid crystal polymer deposited on the photoalignment layer.

4. The system according to claim 1, wherein the template patterned polarization converter further comprises a voltage source, and wherein the patterned quarter wave plate further comprises electrodes;
   wherein the voltage source is configured to apply a voltage to the electrodes to switch the retardation domains on and off, and to tune the retardation domains.

5. The system according to claim 1, wherein the plurality of spatially-varying retardation domains includes first, second and third retardation domains corresponding to different orientations of linearly polarized light.

6. The system according to claim 1, wherein the template patterned polarization converter further includes a non-retardation domain in addition to the plurality of spatially-varying retardation domains.

7. A system for fabricating spatially-varying liquid crystal alignment structures via one-step photoalignment, the system comprising:
   a light source, configured to generate light having a wavelength corresponding to a photoalignment material;
   a template patterned polarization converter, having a spatially-varying azimuthal or radial configuration of retardation domains, configured to convert linearly polarized light from the light source to azimuthally or radially polarized light corresponding to the spatially-varying azimuthal or radial configuration of retardation domains, wherein the template patterned polarization converter comprises two wave plates, including:
      a uniform quarter wave plate with optical axis oriented at +45° or −45° relative to the linearly polarized light from the light source, and
      a patterned quarter wave plate having the spatially-varying azimuthal or radial configuration of retardation domains; and
   a target device, comprising a substrate and a photoalignment layer deposited on the substrate, the photoalignment layer being configured to be exposed to the azimuthally or radially polarized light and being made of the photoalignment material;
   wherein, after exposure, the target device is configured to provide a further patterned quarter wave plate having the same spatially-varying azimuthal or radial configuration of retardation domains as the patterned quarter wave plate of the template patterned polarization converter.

8. The system according to claim 7, wherein the target device further comprises a layer of liquid crystal polymer deposited on the photoalignment layer and configured to be polymerized via ultraviolet exposure to align the molecules of the liquid crystal polymer layer based on the exposed photoalignment layer.

9. The system according to claim 7, wherein the patterned quarter wave plate comprises a substrate, a photoalignment layer deposited on the substrate, and a layer of liquid crystal polymer deposited on the photoalignment layer.

10. The system according to claim 7, wherein the template patterned polarization converter further comprises a voltage source, and wherein the patterned quarter wave plate further comprises electrodes;
    wherein the voltage source is configured to apply a voltage to the electrodes to switch the retardation domains on and off, and to tune the retardation domains.

11. A method for fabricating spatially-varying liquid crystal alignment structures via one-step photoalignment, comprising:
    depositing a photoalignment layer on a substrate; and
    exposing the photoalignment layer through a template patterned polarization converter having a plurality of retardation domains in a spatially-varying configuration with light from a light source to form a patterned quarter wave plate having the same spatially-varying retardation domains as template patterned polarization converter;
    wherein the template patterned polarization converter converts linearly polarized light from the light source to light having a plurality of polarization states corresponding to the plurality of retardation domains; and
    wherein the template patterned polarization converter comprises two wave plates, including:
       a uniform quarter wave plate with optical axis oriented at +45° or −45° relative to the linearly polarized light from the light source, and
       a patterned quarter wave plate having the plurality of spatially-varying retardation domains.

12. The method according to claim 11, further comprising:
    depositing a liquid crystal polymer layer on the photoalignment layer; and
    polymerizing the liquid crystal polymer layer via ultraviolet exposure, wherein the polymerizing aligns the molecules of the liquid crystal polymer layer based on the exposed photoalignment layer.

13. The method according to claim 11, further comprising:
    applying a voltage to a patterned quarter wave plate of the template patterned polarization converter to switch the retardation domains on and off.

14. The method according to claim 11, further comprising:
    applying a voltage to a patterned quarter wave plate of the template patterned polarization converter to tune the retardation domains.

* * * * *